United States Patent
Kurihara et al.

(10) Patent No.: US 8,228,042 B2
(45) Date of Patent: Jul. 24, 2012

(54) BATTERY PACK CHARGING METHOD

(75) Inventors: Toshitake Kurihara, Nishinomiya (JP); Tatsuo Mori, Sumoto (JP); Katsuhiro Suzuki, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 1136 days.

(21) Appl. No.: 12/071,794

(22) Filed: Feb. 26, 2008

(65) Prior Publication Data

US 2008/0203969 A1 Aug. 28, 2008

(30) Foreign Application Priority Data

Feb. 27, 2007 (JP) .................................. 2007-47387

(51) Int. Cl.
*H02J 7/00* (2006.01)
*H01H 35/00* (2006.01)
(52) U.S. Cl. ......... 320/157; 320/152; 320/160; 307/116
(58) Field of Classification Search .................. 320/157
See application file for complete search history.

(56) References Cited

U.S. PATENT DOCUMENTS

| 5,546,003 | A | * | 8/1996 | Noworolski et al. | 324/434 |
|---|---|---|---|---|---|
| 5,747,969 | A | * | 5/1998 | Tamai | 320/141 |
| 5,828,202 | A | * | 10/1998 | Tamai | 320/141 |
| 5,831,412 | A | * | 11/1998 | Morioka et al. | 320/106 |
| 5,861,812 | A | * | 1/1999 | Mitchell et al. | 340/636.1 |
| 5,945,811 | A | * | 8/1999 | Hasegawa et al. | 320/141 |
| 6,459,239 | B1 | * | 10/2002 | Price | 320/130 |
| 2003/0044689 | A1 | * | 3/2003 | Miyazaki et al. | 429/320 |
| 2004/0178768 | A1 | * | 9/2004 | Miyazaki et al. | 320/116 |

FOREIGN PATENT DOCUMENTS

| JP | 2002233069 A | * | 8/2002 |
|---|---|---|---|
| JP | 2003-157908 | | 5/2003 |

* cited by examiner

*Primary Examiner* — Yalkew Fantu
(74) *Attorney, Agent, or Firm* — Wenderoth Lind & Ponack, L.L.P.

(57) ABSTRACT

The battery pack charging method charges a battery pack, which is a plurality of lithium ion rechargeable batteries connected in series, to full charge by constant current and constant voltage charging. Constant current charging is performed until total voltage reaches a prescribed total voltage. Subsequently, constant current charging is switched to constant voltage charging until full charge is reached. In addition, the voltage of each battery being charged is detected. When the voltage of any battery exceeds a first specified voltage, charging is switched to pulse charging.

21 Claims, 9 Drawing Sheets

BATTERY PACK CHARGING METHOD

BACKGROUND OF THE INVENTION

1. Field of the Invention

The present invention relates to a charging method for a battery pack that is a series connection of a plurality of lithium ion rechargeable batteries, and in particular relates to a charging method that charges while protecting a particular battery when its battery voltage becomes high.

2. Description of the Related Art

In a lithium ion rechargeable battery pack, a plurality of batteries are connected in series to raise the output voltage. This battery pack is fully charged by charging with constant current until battery voltage reaches a specified voltage, then subsequently charging with constant voltage to avoid rise in battery voltage. Since battery pack batteries are connected in series, the same charging current flows through all the batteries. If the electrical characteristics of all the series connected batteries are the same, battery voltage will rise in the same manner in all batteries. However, as the batteries degrade with repeated charging and discharging, imbalance will develop between the electrical characteristics of each battery. This is because not all batteries degrade in exactly the same fashion. For batteries with unbalanced electrical characteristics, even if they are charged with the same current, voltage differences can result. In particular, the voltage of a degraded battery will increase. Here, while detecting total voltage, a battery pack is fully charged by constant current charging then switching to constant voltage charging. In a method that charges a battery pack while controlling charging via total voltage, there is no distinction between a particular battery with high voltage and other batteries in a low voltage state. As a result, voltage of a particular battery can become high and it can be detrimentally affected. To eliminate this drawback in prior art charging methods, voltage for each battery is monitored during charging, and charging is suspended if the voltage of any battery exceeds a maximum voltage. In this method, no battery voltage exceeds the maximum voltage. However, in this charging method, since charging is suspended when the voltage of one battery exceeds the maximum voltage, the capacity to which the battery pack can be charged decreases if battery characteristics become unbalanced. (It has the drawback that effective charge capacity of the battery pack is reduced if battery characteristic imbalance develops.) To eliminate this drawback, a charging method that fully charges each series connected battery independently is cited in Japanese Patent Application Disclosure 2003-157908.

SUMMARY OF THE INVENTION

In disclosure 2003-157908, a battery pack is charged by a first charging unit, and by a second charging unit. The first charging unit charges the battery pack with constant current and constant voltage until any one of the series connected batteries becomes fully charged. Since the first charging unit suspends charging with the first battery to reach full charge as the only fully charged battery, charging is suspended with other batteries in a non-fully charged state. Subsequently, the battery pack is charged by the second charging unit. The second charging unit does not charge all series connected batteries with the same charging current, but rather sequentially switches from battery to battery to fully charge each battery independently.

Since each battery is fully charged independently by the charging method of disclosure 2003-157908, each battery can be fully charged even when battery characteristics become unbalanced. Consequently, a battery pack of series connected batteries can be charged to its maximum capacity. However, since this charging method sequentially switches from battery to battery to charge each battery independently, it has the drawback that the charging circuit is extremely complex. Meanwhile, concerning the previously indicated drawback that battery pack effective capacity decreases when battery characteristic imbalance develops, it can be alleviated in prior art charging methods, which suspend charging when the voltage of any battery exceeds a maximum voltage, by setting that maximum voltage to a higher value. The drawback here is that batteries can be detrimentally affected by setting that maximum voltage to a higher value.

The present invention was developed with the object of further eliminating these drawbacks. Thus, it is a primary object of the present invention to provide a battery pack charging method that can charge a battery pack of series connected batteries, which have developed battery characteristic imbalance, to its greatest possible capacity while reducing any negative effect on degraded batteries and while using a simple charging circuit.

The battery pack charging method of the present invention has the following organization to achieve the previously mentioned object. The battery pack charging method charges a battery pack having a plurality of series connected lithium ion rechargeable batteries to full charge via constant current and constant voltage charging. The charging method charges with constant current until total battery pack voltage reaches a specified total voltage. Subsequently, it switches from constant current charging to constant voltage charging and charges until full charge is reached. In addition, the charging method detects the voltage of each battery during charging and switches to pulse charging after the voltage of any battery exceeds a first specified voltage.

The above charging method has the characteristic that a battery pack having a plurality of batteries connected in series can be charged using a simple charging circuit to allow increased charge capacity while reducing negative effects on degraded batteries when battery characteristic imbalance has developed. This is because in addition to charging the battery pack via constant current and constant voltage, the charging method of the present invention detects the voltage of each battery during charging and switches to pulse charging after the voltage of any battery exceeds the first specified voltage. Since pulse charging does not continuously charge a battery, battery voltage rise during charging can be reduced. Therefore, when a battery has degraded and its voltage has increased, charging can proceed while limiting voltage rise in that battery. As a result, a battery pack, which has developed electrical characteristic imbalance in its batteries and charging voltage imbalance, can be further charged while limiting voltage rise in the degraded batteries. Consequently, a battery pack can be charged to a higher capacity for maximum utilization while reducing negative effects on degraded batteries.

In the charging method of the present invention, pulse charging can be implemented as follows. When the voltage of any battery has exceeded the first specified voltage and a first specified time has elapsed, or when the voltage of any battery has exceeded a second specified voltage, which is higher than the first specified voltage, and a second specified time has elapsed, charging can be suspended. When the voltage of all batteries has decreased below the first specified voltage and a third specified time has elapsed, charging can be re-started.

In pulse charging for the charging method of the present invention, when the voltage of any battery exceeds the second specified voltage, which is higher than the first specified voltage, the duty cycle of pulse charging can be reduced or the frequency of pulse charging can be increased.

In pulse charging for the charging method of the present invention, when the voltage difference between any two batteries exceeds a third specified voltage, the duty cycle of pulse charging can be reduced or the frequency of pulse charging can be increased.

The first specified voltage for the charging method of the present invention can be set at 3.9V to 4.4V.

Further, in the charging method of the present invention, the first specified voltage can be set at 3.9V to 4.4V and the first specified time can be set at 0 sec to 180 sec. The second specified voltage can be set at the first specified voltage plus 0V to plus 0.4V, the second specified time can be set at 0 sec to 10 sec, and the third specified time can be set at 0 sec to 120 sec.

In the charging method of the present invention, the first specified voltage can be set at 3.9V to 4.4V and the second specified voltage can be set at the first specified voltage plus 0V to plus 0.4V.

In the charging method of the present invention, the third specified voltage can be set at 0.03V to 0.30V. The above and further objects of the present invention as well as the features thereof will become more apparent from the following detailed description to be made in conjunction with the accompanying drawings.

DETAILED DESCRIPTION OF THE PREFERRED EMBODIMENTS

Figure 1:
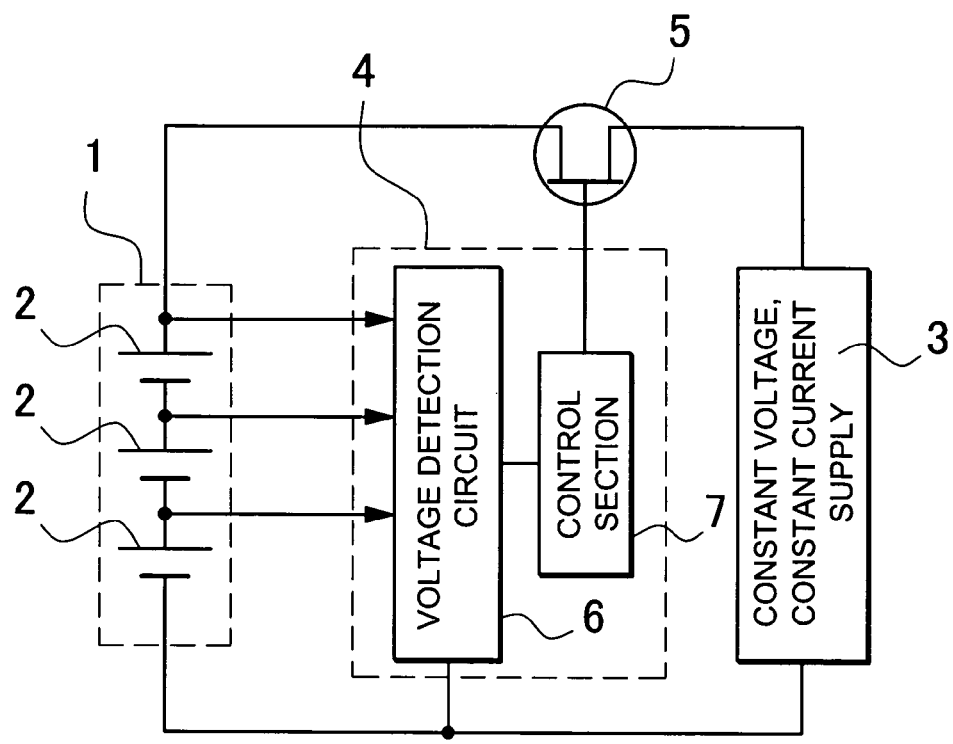
FIG. 1 is a block diagram showing an example of a charging circuit used for one embodiment of the battery pack charging method of the present invention.

The battery pack 1 of FIG. 1 has a plurality of lithium ion rechargeable batteries 2 connected in series. This battery pack 1 is charged by a constant current, constant voltage power supply 3. The constant current, constant voltage supply 3 charges the battery pack 1 with output voltage limited below the maximum voltage and output current limited below the maximum current. For a discharged battery pack 1, total output voltage is reduced. When a discharged battery pack 1 is charged by the constant current, constant voltage supply 3, total battery pack 1 voltage is less than the maximum voltage of the power supply. Therefore, voltage is not limited but output current is limited to the maximum supply current and the battery pack 1 is charged by a constant current. As charging proceeds, total battery pack 1 voltage rises. When total battery pack 1 voltage rises to the maximum voltage of the constant current, constant voltage supply 3, voltage is limited to that maximum voltage and constant voltage charging takes place. As a result, initially the battery pack 1 is charged by the constant current, constant voltage supply 3 via constant current charging. When total battery pack 1 voltage reaches the maximum voltage, it is charged by constant voltage charging at that maximum voltage.

The total voltage of the constant current, constant voltage supply 3 is set to the number of series connected batteries times 4.20V (the desired constant voltage). Therefore, a battery pack 1 having three lithium ion rechargeable batteries 2 connected in series has its total voltage for constant voltage charging (the desired total voltage) set to 12.60V. Charge capacity of the battery pack 1 can be increased by increasing this total voltage. However, since battery degradation increases with total voltage increase, an optimum value is set considering battery degradation and charge capacity. In addition, optimum total voltage is set considering the type of lithium ion rechargeable batteries 2 including, for example, the type of electrode material.

Further, battery pack 1 charging time can be shortened by increasing the current for constant current charging of the battery pack 1 by the constant current, constant voltage supply 3. Again, however, if the charging current is increased, the effect on the batteries also increases and battery degradation can easily occur. Consequently, the current for constant current charging is set to an optimum value considering battery life and charging time.

The constant current, constant voltage supply 3 is provided with a full charge detection circuit (not illustrated) that detects battery pack 1 charging current to determine full charge. This full charge detection circuit detects battery pack 1 average charging current during charging to determine full charge. For a battery pack 1 with lithium ion rechargeable batteries 2 connected in series, charging current decreases as the battery pack 1 nears full charge during final constant voltage charging. Therefore, the full charge detection circuit judges the battery pack 1 fully charged and suspends charging when the average charging current drops below a full charge current. In the charging method of the present invention, since the battery pack 1 is pulse charged when battery characteristics become unbalanced, the full charge detection circuit detects average current during pulse charging to determine full charge.

When all the series connected batteries have uniform characteristics and there is no imbalance or there is little imbalance, the battery pack 1 is charged to full charge by the constant current, constant voltage supply 3. However, as charging and discharging of the battery pack 1 is performed repeatedly, battery characteristic imbalance develops. For example, with 100 repeated charge-discharge cycles, imbalance will develop in the electrical characteristics of the batteries of the battery pack 1.

The charging circuit of FIG. 1 is provided with a control circuit 4 that detects the voltage of each battery and controls charging, and a switching device 5 that is switched on and off by the control circuit 4. The control circuit 4 is provided with a voltage detection circuit 6 that detects the voltage of each series connected battery, and a control section 7 that switches the switching device 5 on and off for pulse charging based on output from the voltage detection circuit 6.

Figure 2:
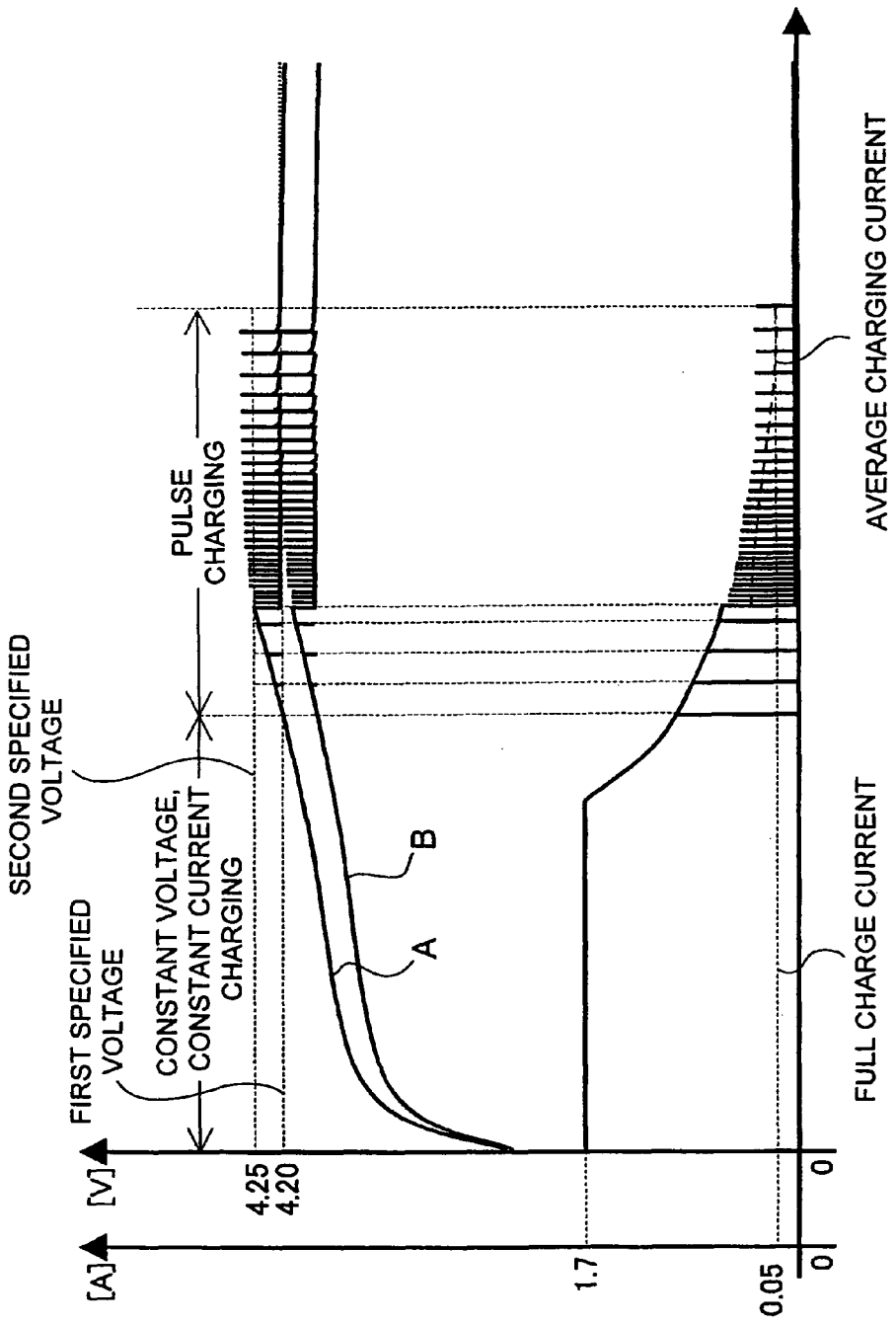
FIG. 2 is a graph showing battery voltage characteristics during charging in one embodiment of the charging method of the present invention.
Figure 3:
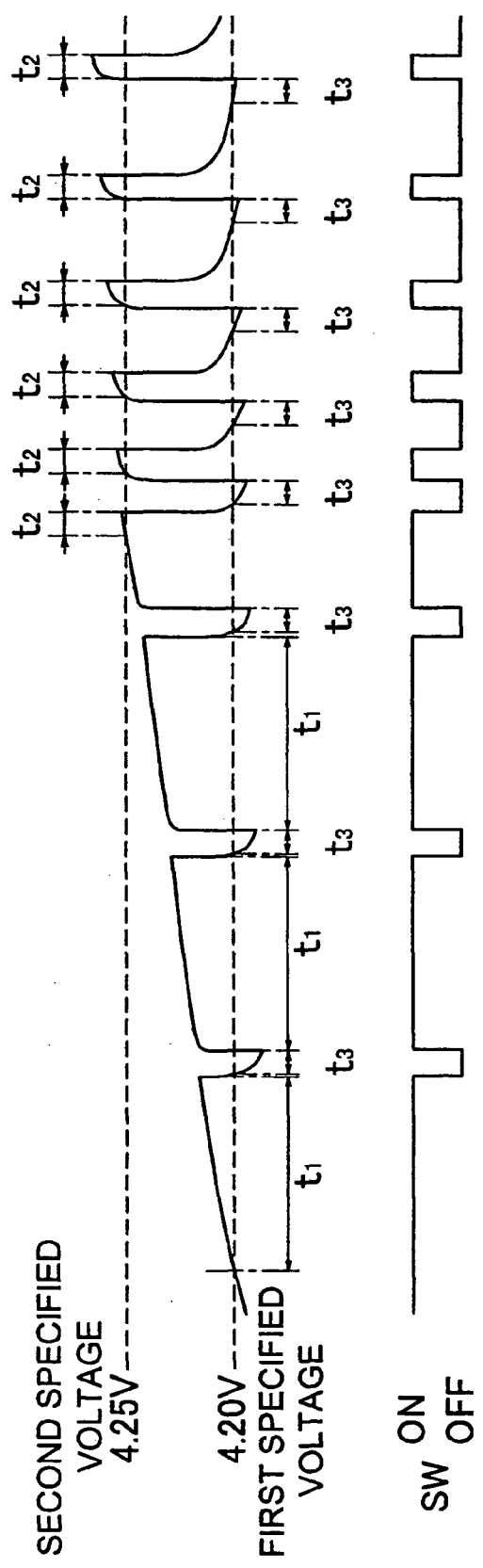
FIG. 3 is an abbreviated enlarged view of the graph shown in FIG. 2.

As shown in FIG. 2, the control section 7 compares each battery voltage input from the voltage detection circuit 6 with a pre-stored first specified voltage. If the voltage of any battery becomes greater than the first specified voltage, pulse charging is initiated. In FIG. 2, curve A shows the voltage characteristics for a battery with high voltage rise, and curve B shows the voltage characteristics for other batteries with normal voltage rise. When three batteries 2 are used as in FIG. 1, a battery 2 with high voltage rise is shown by the characteristics of curve A, and the characteristics of the other two batteries 2 are shown by curve B. As shown in FIG. 3, when the voltage of any battery exceeds the first specified voltage, the control section 7 begins a count of the time that voltage is exceeded (over-voltage time). When that elapsed over-voltage time reaches a first specified time (t1), the switching device 5 is switched off. Subsequently, when the voltage of all batteries drops below the first specified voltage, the control section 7 begins a count of the under-voltage time. When that under-voltage time reaches a third specified time (t3), the switching device 5 is controlled to switch from off to on resulting in pulse charging of the battery pack 1. The first specified voltage is set, for example, to 4.20V to avoid complicated control in lower voltage regions and to limit power consumption by the control section. However, the first specified voltage can also be set at 3.9V to 4.4V. In addition, for a battery voltage detection method where measurement is timed to be taken when charging is temporarily suspended (battery open circuit voltage [OCV] measurement method), voltage can be set, for example, 0.1 V to 0.3V lower than the first specified voltage given above. The first specified time (t1) can be set at 0 sec to 180 sec, and in particular can be set at 0.5 sec to 10 sec when the second specified voltage described below is not used. When the second specified voltage is used, the first specified time (t1) can be set at 20 sec to 80 sec or about 60 sec. Here, a first specified time (t1) set to 0 sec means (pulse charging if the second specified voltage described below is exceeded) when the voltage of any battery exceeds the first specified voltage, the control section 7 immediately turns the switching device 5 off and this indicates charging where battery voltage does not in actuality exceed the first specified voltage. The third specified time (t3) can be set at 0 sec to 120 sec, and preferably 0.5 sec to 2 sec. Here, a third specified time (t3) of 0 sec means when the voltage of all batteries has dropped below the first specified voltage, the control section 7 immediately turns the switching device 5 on to resume charging.

In pulse charging, when the voltage of any battery exceeds a second specified voltage, which is higher than the first specified voltage, and a second specifies time (t2) has elapsed, the control section 7 turns the switching device 5 off. After the switching device 5 has been turned off, when battery voltage drops below the first specified voltage (4.20V) and the third specified time (t3) has elapsed, the switching device 5 is again turned on. By repetition of these switching operations, the battery pack 1 is pulse charged. The second specified voltage is set, for example, at 4.25V. However, the second specified voltage can be set to the first specified voltage plus 0.0V to plus 0.4V. The second specified time (t2) can be set at 0 sec to 10 sec, and preferably 0.5 sec to 2 sec. Here, a second specified time (t2) set to 0 sec means (pulse charging if the first specified voltage described above is exceeded) when the voltage of any battery exceeds the second specified voltage, the control section 7 immediately turns the switching device 5 off. In the implementation of this type of pulse charging, after detection of the open circuit battery voltage dropping to the first specified voltage (4.20V), the switching device is turned on for pulse charging only for a prescribed time interval. Therefore, in the stable state after a pulse charge, the open circuit voltage for all the batteries, and in particular the battery with the highest voltage, does not exceed the first specified voltage (4.20V). Further, even for batteries with voltage that does not exceed the first specified voltage (4.20V) during charging, their voltage gradually approaches the first specified voltage as a result of pulse charging. Again, in FIG. 2, curve A represents voltage characteristics for a battery with high voltage rise, and curve B represents the voltage characteristics for other batteries with normal voltage rise. Further, as previously described, total constant current, constant voltage supply 3 voltage is the number of series connected batteries times the desired constant voltage of each battery, and the battery pack 1 is charged by constant voltage at the desired total voltage as a maximum. Therefore, during pulse charging when a pulse is on (during charging), if the voltage applied to each battery is added, that voltage is below the desired total voltage.

When battery voltage exceeds the second specified voltage, the duty cycle for off and on switching of the switching device 5 can be decreased, or the frequency of pulse charging can be increased. The control section 7 can shorten on-time relative to off-time to decrease the duty cycle, for example, by lowering the second specified voltage, by shortening the first and second specified times, or by lengthening the third specified time. Otherwise, the control section 7 can shorten the first, second, and third specified times in the same fashion to increase the pulse charging frequency. These techniques charge the battery pack 1 while reducing battery voltage rise.

Further, the control section 7 can detect voltage difference between batteries by the input from the voltage detection circuit 6. Battery voltage difference can be compared to a pre-stored third specified voltage. When voltage difference between any batteries exceeds the third specified voltage, the pulse charging duty cycle can be reduced or the frequency can be increased. As previously described, the control section 7 can decrease the duty cycle by changing the first or second specified voltage, or the first, second, or third specified times, or it can increase the pulse charging frequency. The third specified voltage can be set at 0.03V to 0.30V, and preferably 0.03V to 0.05V. This technique as well charges the battery pack 1 while reducing battery voltage rise.

In the charging method of the present invention, instead of pulse charging as described above, the control section 7 can switch the switching device 5 on and off at pre-stored prescribed time periods (and duty cycles) to pulse charge the battery pack 1. In this type of pulse charging, when battery voltage exceeds the first specified voltage, the control section 7 initiates pulse charging by switching the switching device 5 on and off according to the pre-stored time periods (and duty cycles). In this charging method as well, when battery voltage exceeds the second specified voltage or when battery voltage difference exceeds the third specified voltage, the duty cycle of the switching device 5 can be reduced or the pulse charging frequency can be increased.

Full charge of the battery pack 1 is determined when the average charging current drops below a pre-set full charge current. This is determined from average battery pack 1 current during charging by the constant current, constant voltage supply 3. Instead, however, battery pack 1 full charge can also be detected by the control circuit 4 during pulse charging. Here, the control circuit 4 measures open circuit voltage (OCV) of each battery during pulse charging when the switching device 5 is in the off state. Full charge is judged when the open circuit voltage (OCV) of any battery reaches a full charge voltage (for example, 4.20V). If the full charge voltage is set too high, battery degradation will increase, and if it is set too low, charge capacity will be reduced. Consequently, the full charge voltage is set to an optimum voltage considering the degree of battery degradation, charge capacity, and battery type, and is set for example, in the range from 4.1V to 4.25V.

Figure 4:
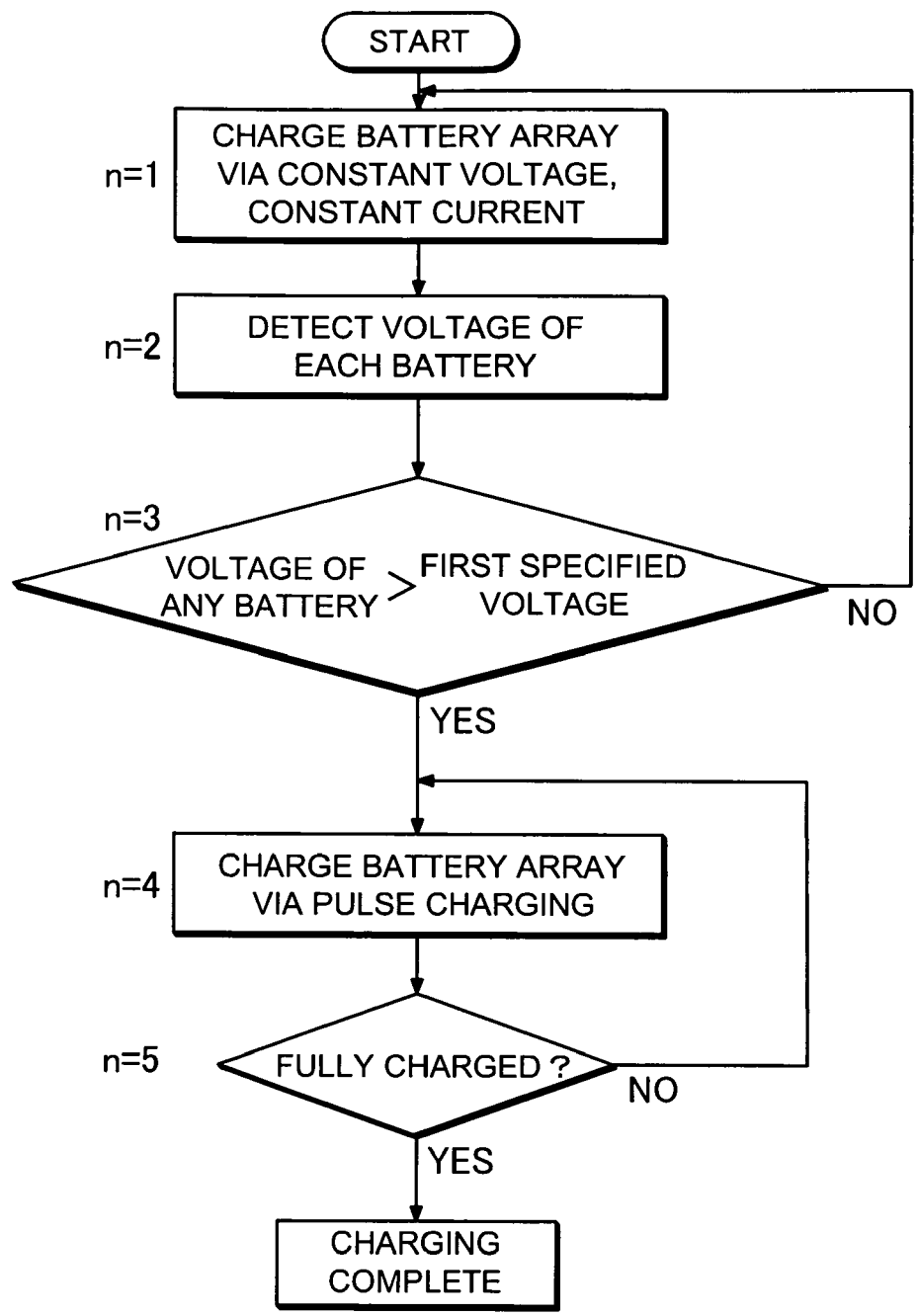
FIG. 4 is a flow-chart for battery pack charging in one embodiment of the charging method of the present invention.

The previously described charging circuit charges a battery pack 1 by the following steps shown in FIG. 4.

[Step n=1]
The battery pack 1 is charged by the constant current, constant voltage supply 3. Total battery pack 1 voltage is measured and the constant current, constant voltage supply 3 charges with constant current until the total voltage reaches the prescribed total voltage. After the total voltage rises to the total prescribed voltage, the constant current, constant voltage supply 3 charges with constant voltage at that voltage.

[Step N=2]
While the battery pack 1 is charged by constant current or constant voltage, the voltage detection circuit 6 of the control circuit 4 detects the voltage of each battery. The voltage detection circuit 6 measures battery voltage during charging. Specifically, the voltage detection circuit 6 measures battery charging voltage. However, the voltage detection circuit 6 can also measure the voltage of each battery when charging is temporarily suspended.

[Step N=3]
It is determined if the voltage of any battery measured by the voltage detection circuit 6 exceeds the first specified voltage. The first specified voltage is different depending on whether battery voltage is measured during charging or while charging is temporarily suspended. In the method of measuring battery voltage during charging, the first specified voltage is set, for example, to 4.20V. In the method of measuring battery voltage while charging is temporarily suspended, the first specified voltage is set to a voltage lower than that for battery voltage measured during charging. In the method of measuring battery voltage while charging is temporarily suspended, the first specified voltage is set, for example, to 4.15V.

[Step N=4]
Pulse charging is initiated when the voltage of any battery exceeds the first specified voltage. In pulse charging, when the voltage of any battery exceeds the first specified voltage (for example, 4.20V) and the first specified time (for example, 60 sec) has elapsed, or when the voltage of any battery exceeds the second specified voltage (for example, 4.25V) and the second specified time (for example, 0.25 sec) has elapsed, the control section 7 turns the switching device 5 off. After the switching device 5 has been turned off, when the voltage of all batteries has dropped below the first specified voltage (for example, 4.20V) and the third specified time (for example, 0.5 sec) has elapsed, the switching device 5 is turned on again. Battery pack 1 pulse charging is implemented by repetition of this control sequence.

[Step N=5]
When full charge of the pulse charged battery pack 1 is detected, charging is suspended. Battery pack 1 full charge can be determined by the constant current, constant voltage supply 3. In this method, the constant current, constant voltage supply 3 detects average charging current of the battery pack 1. When battery pack 1 charging current becomes lower than the full charge current, full charge is judged and charging is stopped. However, full charge can also be detected by the following method. This method determines full charge from battery open circuit voltage (OCV) when charging is suspended. When the open circuit voltage of the highest voltage battery reaches 4.20V, the control circuit 4 judges full charge and turns the switching device 5 off to stop charging. The constant current, constant voltage supply 3 has a charging current cut-off switching device (not illustrated) connected to its output side. When full charge is detected, that switching device is switched off to cut-off charging current.

Figure 5:
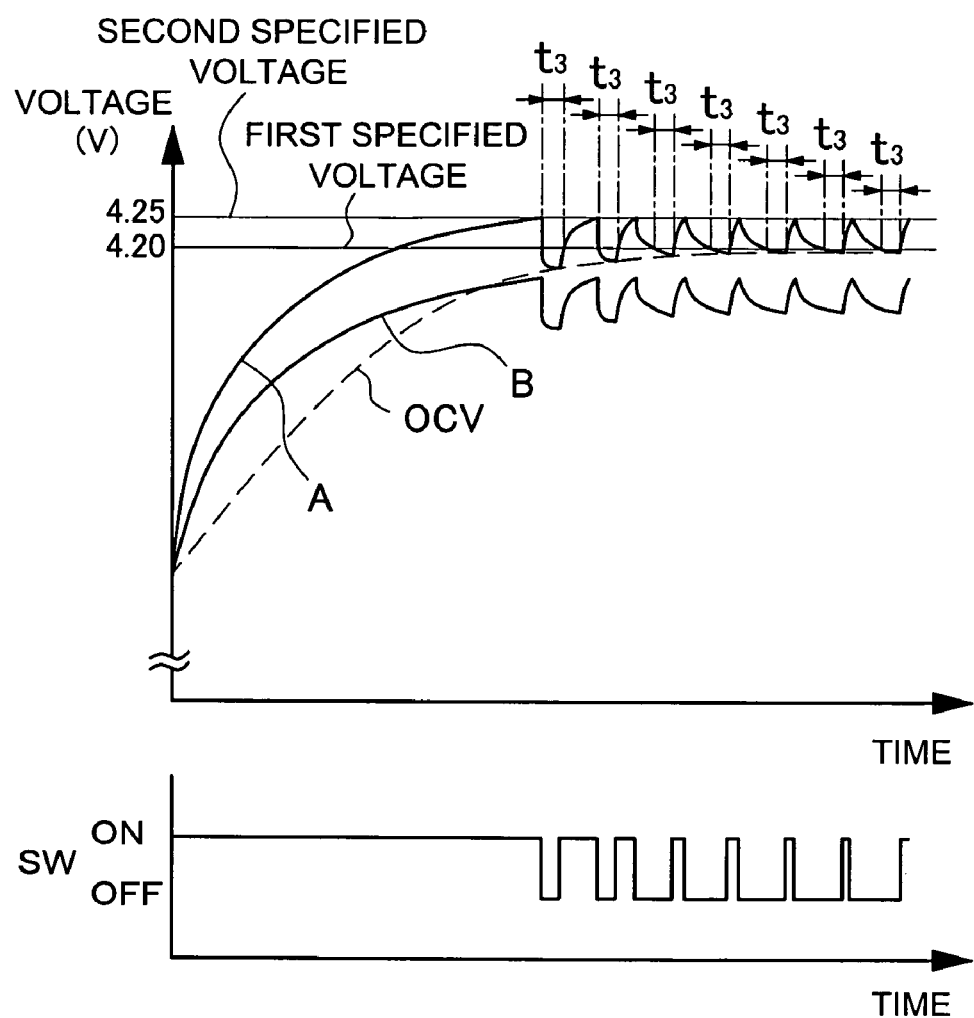
FIG. 5 is a graph showing battery voltage characteristics during charging in another embodiment of the charging method of the present invention.

As another embodiment of the charging method of the present invention, pulse charging can be performed as follows after the voltage of any battery exceeds the first specified voltage. As shown in FIG. 5, this charging method compares battery voltage with the second specified voltage, which is higher than the first specified voltage. When the voltage of any battery exceeds the second specified voltage, the switching device 5 is turned off. When the voltage of all batteries has dropped below the first specified voltage and the third specified time has elapsed (t3), the switching device 5 is controlled to switch from off to on to pulse charge the battery pack 1. In the method of measuring battery voltage during charging, the first specified voltage is set, for example, to 4.20V and the second specified voltage is set, for example, to 4.25V. The third specified time (t3) is set, for example, to 0.5 sec. However, the first specified voltage can be set at 3.9V to 4.4V and the second specified voltage can be set at the first specified voltage plus 0V to plus 0.4V. Meanwhile, the third specified time (t3) can be set at 0 sec to 120 sec, and preferably 0.5 sec to 2 sec. In this type of pulse charging, since switching device on time decreases while off time increases as charging progresses, the duty cycle is controlled to decrease. Further, when the voltage of any battery exceeds the second specified voltage, the control section 7 immediately turns the switching device 5 off. Therefore, charging can be performed without any battery voltage exceeding the second specified voltage in actuality. The battery pack 1 can also be pulse charged by the control section 7 switching the switching device 5 on and off at a prescribed time period when the voltage of any battery exceeds the second specified voltage. Again, in FIG. 5, curve A represents voltage characteristics for a battery with high voltage rise, and curve B represents the voltage characteristics for other batteries with normal voltage rise. In pulse charging for this type of embodiment, after detection of the open circuit battery voltage dropping to the first specified voltage (4.20V), the switching device is turned on for pulse charging only until the second specified voltage is reached. Therefore, in the stable state after a pulse charge, the open circuit voltage for all the batteries, and in particular the battery with the highest voltage, does not exceed the first specified voltage (4.20V). Further, even for batteries 2 with voltage that does not exceed the first specified voltage during charging, their voltage gradually approaches the first specified voltage as a result of pulse charging.

Figure 6:
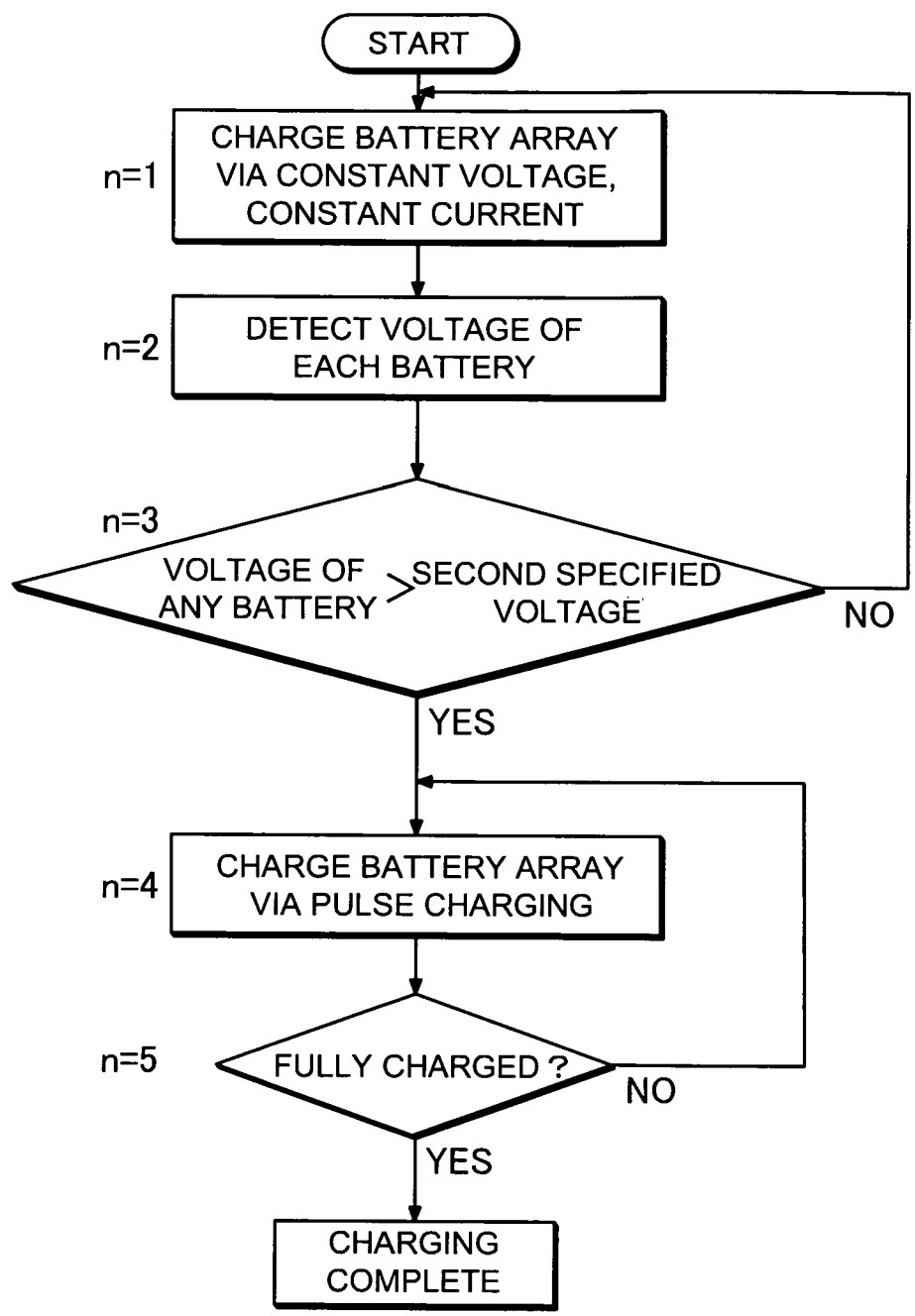
FIG. 6 is a flow-chart for battery pack charging by the charging method shown in FIG. 5.

This charging method charges a battery pack 1 by the following steps shown in FIG. 6.

[Step N=1]
The battery pack 1 is charged by the constant current, constant voltage supply 3. Total battery pack 1 voltage is measured and the constant current, constant voltage supply 3 charges with constant current until the total voltage reaches the prescribed total voltage. After the total voltage rises to the total prescribed voltage, the constant current, constant voltage supply 3 charges with constant voltage at that voltage.

[Step N=2]
While the battery pack 1 is charged by constant current or constant voltage, the voltage detection circuit 6 of the control circuit 4 detects the voltage of each battery. The voltage detection circuit 6 measures battery voltage during charging. Specifically, the voltage detection circuit 6 measures battery charging voltage.

[Step N=3]

After the first specified voltage is exceeded, it is determined if the voltage of any battery measured by the voltage detection circuit 6 exceeds the second specified voltage, which is higher than first specified voltage. The first specified voltage is set, for example, to 4.20V and the second specified voltage is set, for example, to 4.25V.

[Step N=4]

When the voltage of any battery exceeds the second specified voltage, the control section 7 switches the switching device 5 on and off to pulse charge the battery pack 1. In this pulse charging, when the voltage of any battery exceeds the second specified voltage, the switching device 5 is turned off. When the voltage of all batteries has dropped below the first specified voltage and the third specified time has elapsed (t3), the switching device 5 is controlled to switch from off to on. The third specified time (t3) is set, for example, to 0.5 sec.

[Step N=5]

When full charge of the pulse charged battery pack 1 is detected, charging is suspended. Full charge of the pulse charged battery pack 1 is determined by average charging current. When the detected average charging current becomes lower than the full charge current, battery pack 1 full charge is judged and charging is stopped. The constant current, constant voltage supply 3 has a charging current cut-off switching device (not illustrated) connected to its output side, and that switching device is switched off to cut-off charging current. However, battery pack 1 full charge can also be detected from battery open circuit voltage (OCV) when charging is suspended. When the open circuit voltage of the highest voltage battery reaches 4.20V, the control circuit 4 judges full charge and turns the switching device 5 off to stop charging.

Figure 7:
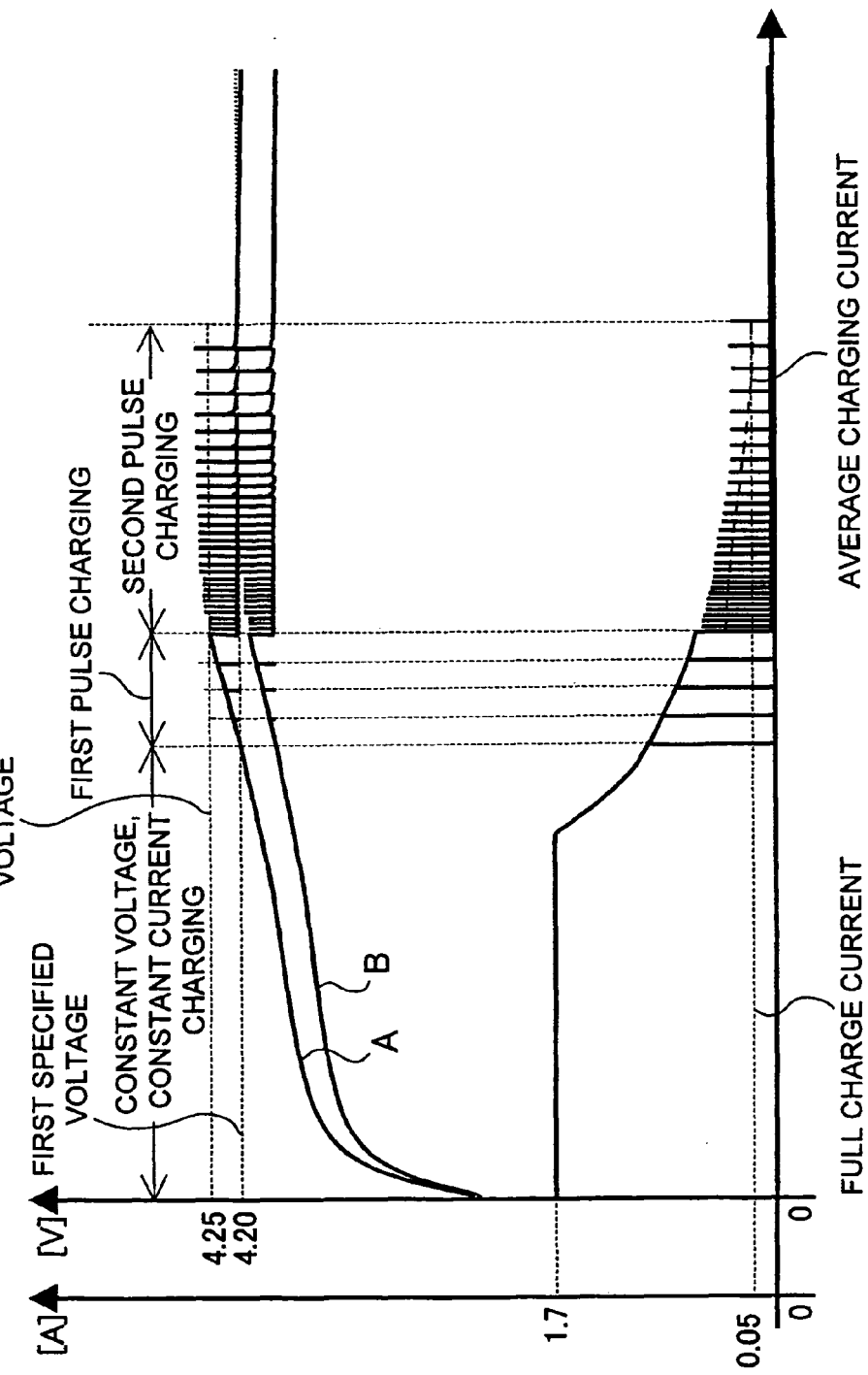
FIG. 7 is a graph showing battery voltage characteristics during charging in another embodiment of the charging method of the present invention.
Figure 8:
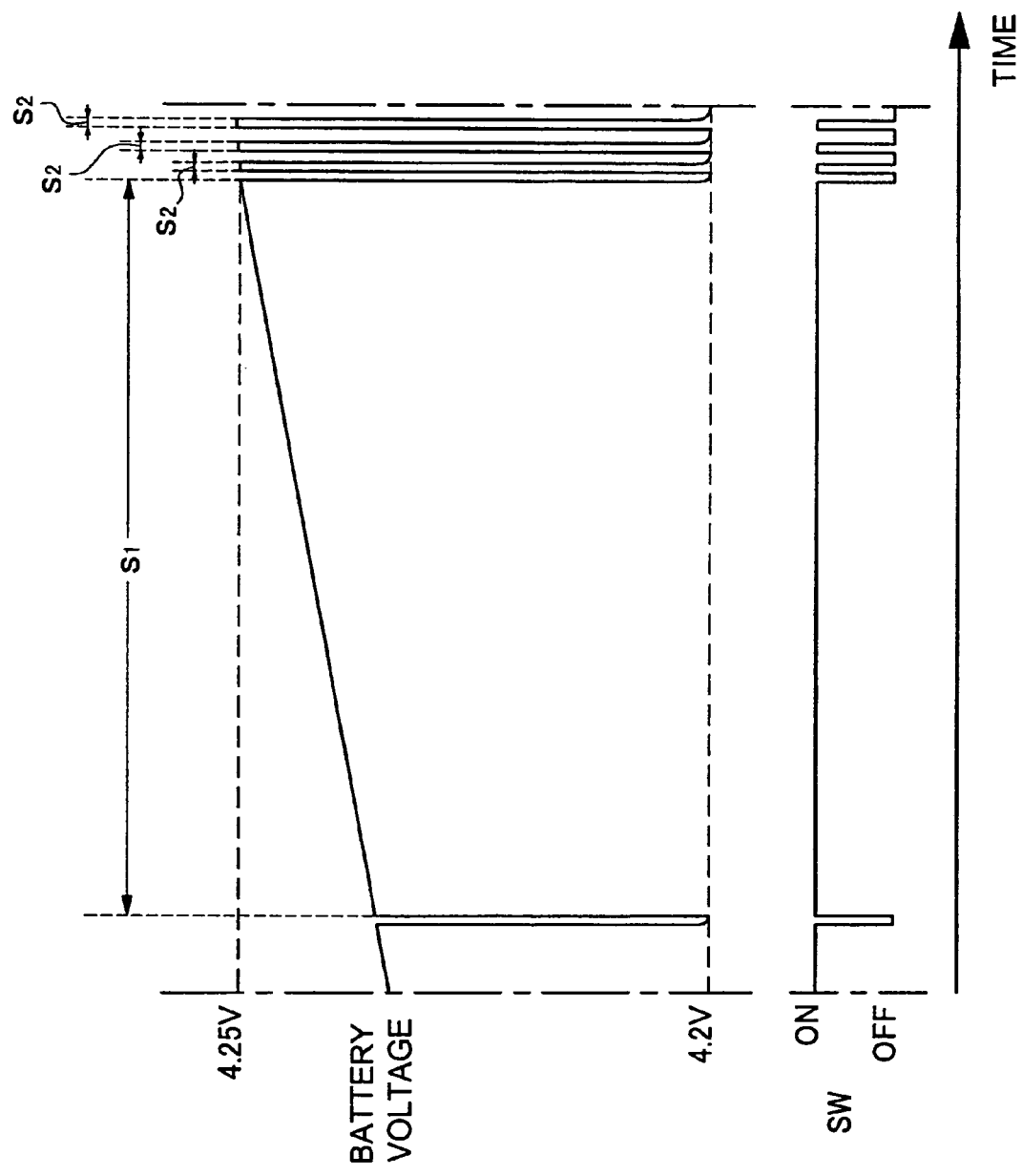
FIG. 8 is an enlarged view of pertinent parts of the graph shown in FIG. 7.

As another embodiment of the charging method of the present invention, pulse charging can be performed as follows when the voltage of any battery exceeds the first specified voltage. As shown in FIGS. 7 and 8, this charging method pulse charges batteries by a first pulse charging and a second pulse charging, in which the switching device 5 is switched to the on state for different lengths of time. Again, in FIG. 7, curve A represents voltage characteristics for a battery with high voltage rise, and curve B represents the voltage characteristics for other batteries with normal voltage rise. In this charging method, first pulse charging is initiated when the voltage of any battery exceeds the first specified voltage (for example, 4.20V). During first pulse charging, when the voltage of any battery exceeds the second specified voltage (for example, 4.25V), battery pack 1 charging switches to second pulse charging. Time in the on state for the switching device 5 is set longer for first pulse charging than for second pulse charging.

As shown in FIG. 8 for first pulse charging, the switching device 5 is in the on state only for the first on-time (s1). When the first on-time has elapsed, the switching device 5 is turned off to pulse charge the battery pack 1. This first on-time (s1) is set, for example, to 60 sec. However, this first on-time can also be set, for example, at 0 sec to 180 sec, and preferably 20 sec to 80 sec. After the switching device 5 has been switched off and battery voltage (open circuit voltage) has dropped to the first specified voltage, the switching device 5 is again turned on only for the first on-time (s1) to repeat the pulse charging. In this manner, the switching device 5 is repeatedly switched on and off for first pulse charging of the battery pack 1 until the voltage of any battery reaches the second specified voltage (for example, 4.25V). During first pulse charging, if the voltage of any battery exceeds the second specified voltage (for example, 4.25V), charging switches to second pulse charging.

As shown in FIG. 8 for second pulse charging, the switching device 5 is in the on state only for the second on-time (s2). When the second on-time has elapsed, the switching device 5 is turned off to pulse charge the battery pack 1. This second on-time (s2) is shorter than the first on-time (s1) and is set, for example, to 125 msec. However, this second on-time can also be set, for example, at 50 msec to 250 msec. After the switching device 5 has been switched off and battery voltage (open circuit voltage) has dropped to the first specified voltage, the switching device 5 is again turned on only for the second on-time (s2) to repeat the pulse charging. In this manner, the switching device 5 is repeatedly switched on and off for second pulse charging of the battery pack 1 until full charge is detected. For example, average charging current of the battery pack 1 is measured and when that average charging current becomes lower than the full charge current, battery pack 1 full charge is judged.

In the charging method described above, after detection of the open circuit battery voltage dropping to the first specified voltage (4.20V), the switching device is turned on for pulse charging only for prescribed time intervals. Therefore, in the stable state after a pulse charge, the open circuit voltage for all the batteries, and in particular the battery with the highest voltage, does not exceed the first specified voltage (4.20V). Further, even for batteries 2 with voltage that does not exceed the first specified voltage (4.20V) during charging, their voltage gradually approaches the first specified voltage as a result of pulse charging. Consequently, by limiting the open circuit voltage of degraded batteries to a voltage below the first specified voltage and drastically reducing negative effects on those batteries, all batteries can be charged as much as possible to a high capacity. Further, by keeping the average charging voltage for any battery during pulse charging less than the second specified voltage (for example, 4.25V), which is greater than the first specified voltage, negative effects on the batteries can be reduced.

Figure 9:
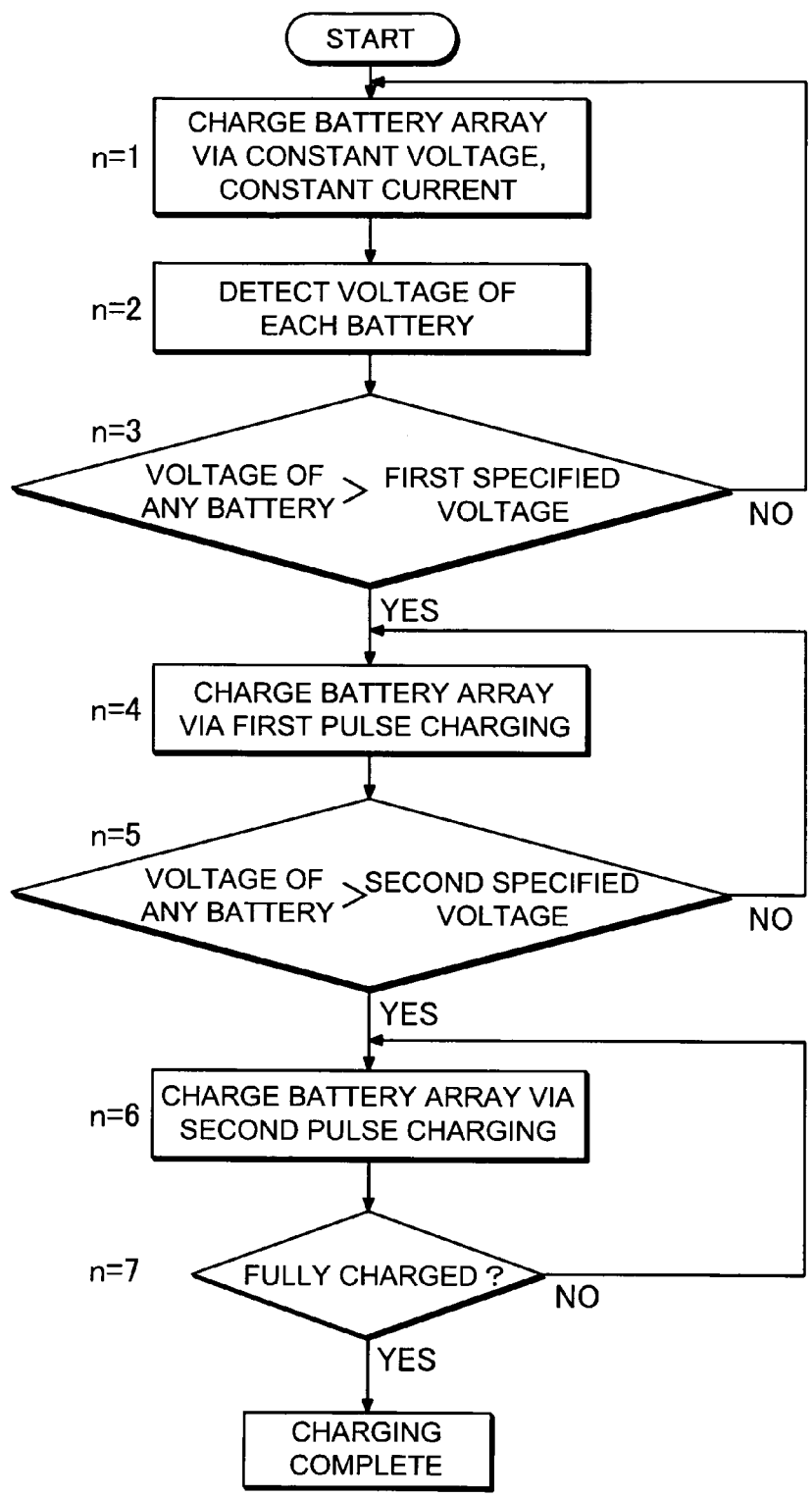
FIG. 9 is a flow-chart for battery pack charging by the charging method shown in FIG. 7.

This charging method charges a battery pack 1 by the following steps shown in FIG. 9.

[Step N=1]

The battery pack 1 is charged by the constant current, constant voltage supply 3. Total battery pack 1 voltage is measured and the constant current, constant voltage supply 3 charges with constant current until the total voltage reaches the prescribed total voltage. After the total voltage rises to the total prescribed voltage, the constant current, constant voltage supply 3 charges with constant voltage at that voltage.

[Step N=2]

While the battery pack 1 is charged by constant current or constant voltage, the voltage detection circuit 6 of the control circuit 4 detects the voltage of each battery. The voltage detection circuit 6 measures battery voltage during charging. Specifically, the voltage detection circuit 6 measures battery charging voltage.

[Step N=3]

It is determined if the voltage of any battery measured by the voltage detection circuit 6 exceeds the first specified voltage. The first specified voltage is set, for example, to 4.20V.

[Steps N=4 and 5]

When the voltage of any battery exceeds the first specified voltage, the control section 7 charges the battery pack 1 by first pulse charging. In this first pulse charging, the battery pack 1 is pulse charged with the switching device 5 in the on state only for a specified time interval, which is the first on-time (s1). This first on-time (s1) is set, for example, to 60 sec. After the switching device 5 has been switched off and battery voltage (open circuit voltage) has dropped to the first specified voltage (4.20V), the switching device 5 is again turned on only for the first on-time (s1) to repeat the pulse charging. First pulse charging is continued until the voltage of any battery reaches the second specified voltage. The second specified voltage, which is higher than the first specified voltage, is set, for example, to 4.25V.

[Steps N=6 and 7]

When the voltage of any battery exceeds the second specified voltage, the control section 7 switches to second pulse charging to pulse charge the battery pack 1. In this second pulse charging, the switching device 5 is in the on state only for the second on-time (s2), which is shorter than the first on-time (s1). This second on-time (s2) is set, for example, to 125 msec. After the switching device 5 has been switched off and battery voltage (open circuit voltage) has dropped to the first specified voltage (4.20V), the switching device 5 is again turned on only for the second on-time (s2) to repeat the pulse charging. Second pulse charging is continued until battery pack 1 full charge is detected. When full charge is detected, charging is stopped. Full charge of the pulse charged battery pack 1 is determined from average charging current. When the measured average charging current becomes lower than the full charge current, battery pack 1 full charge is judged.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2007-47387 filed in Japan on Feb. 27, 2007, the content of which is incorporated herein by reference.

What is claimed is:

1. A battery pack charging method for charging a battery pack having a plurality of lithium ion rechargeable batteries connected in series to a full charge by using a constant current charging and a constant voltage charging, the method comprising:

performing the constant current charging until a total battery pack voltage reaches a prescribed total voltage;

switching from the constant current charging to the constant voltage charging after the total battery pack voltage reaches the prescribed total voltage, until a full charge is reached;

detecting a voltage of each of the plurality of lithium ion rechargeable batteries being charged; and switching from the constant voltage charging or the constant current charging to a pulse charging after the voltage of any of the plurality of lithium ion rechargeable batteries exceeds a first specified voltage, such that prior to switching to the pulse charging, the constant current charging and the constant voltage charging are repeatedly performed until the voltage of any of the plurality of lithium ion rechargeable batteries has a voltage that exceeds the first specified voltage, wherein during pulse charging, when the voltage of any of the plurality of lithium ion rechargeable batteries has exceeded the first specified voltage and a first specified time has elapsed, and when the voltage of any of the plurality of lithium ion rechargeable batteries has exceeded a second specified voltage, which is higher than the first specified voltage, and a second specified time has elapsed, charging is suspended, and charging is re-started after an interval or a third specified time has elapsed and the voltage of all the batteries has dropped below the first specified voltage.

2. The battery pack charging method as recited in claim 1, wherein during the pulse charging, when the voltage of any of the plurality of lithium ion rechargeable batteries exceeds the second specified voltage, which is higher than the first specified voltage, a duty cycle for the pulse charging is decreased.

3. The battery pack charging method as recited in claim 1, wherein during the pulse charging, when the voltage of any of the plurality of lithium ion rechargeable batteries exceeds the second specified voltage, which is higher than the first specified voltage, a frequency of the pulse charging is increased.

4. The battery pack charging method as recited in claim 1 wherein during the pulse charging, when the voltage difference between any of the plurality of lithium ion rechargeable batteries exceeds a third specified voltage, a duty cycle for the pulse charging is decreased.

5. A battery pack charging method for charging a battery pack having a plurality of lithium ion rechargeable batteries connected in series to a full charge by using a constant current charging and a constant voltage charging, the method comprising:

performing the constant current charging until a total battery pack voltage reaches a prescribed total voltage;

switching from the constant current charging to the constant voltage charging after the total battery pack voltage reaches the prescribed total voltage, until a full charge is reached;

detecting a voltage of each of the plurality of lithium ion rechargeable batteries being charged; and switching from the constant voltage charging or the constant current charging to a pulse charging after the voltage of any of the plurality of lithium ion rechargeable batteries exceeds a first specified voltage, wherein during the pulse charging, when the voltage difference between any of the plurality of lithium ion rechargeable batteries exceeds a third specified voltage, a frequency of pulse charging is increased.

6. The battery pack charging method as recited in claim 1, wherein the first specified voltage is 3.9V to 4.4V.

7. The battery pack charging method as recited in claim 6, wherein the first specified voltage is 4.2V.

8. The battery pack charging method as recited in claim 2, wherein the first specified time is 0 sec to 180 sec.

9. The battery pack charging method as recited in claim 2, wherein the first specified time is 2 sec to 10 sec.

10. The battery pack charging method as recited in claim 2, wherein the first specified time is 20 sec to 80 sec.

11. The battery pack charging method as recited in claim 2, wherein the first specified voltage is 3.9V to 4.4V, and the first specified time is 0 sec to 80 sec.

12. The battery pack charging method as recited in claim 2, wherein the second specified voltage is the first specified voltage plus 0.0V to plus 0.4V.

13. The battery pack charging method as recited in claim 2, wherein the second specified voltage is 4.25V.

14. The battery pack charging method as recited in claim 2, wherein the second specified time is 0 sec to 10 sec.

15. The battery pack charging method as recited in claim 2, wherein the second specified voltage is the first specified voltage plus 0.0V to plus 0.4V, and the second specified time is 0 sec to 10 sec.

16. The battery pack charging method as recited in claim 2, wherein the third specified time is 0 sec to 120 sec.

17. The battery pack charging method as recited in claim 16, wherein the third specified time is 0.5 sec to 2 sec.

18. The battery pack charging method as recited in claim 12, wherein the first specified voltage is 3.9V to 4.4V, and the second specified voltage is the first specified voltage plus 0.0V to plus 0.4V.

19. The battery pack charging method as recited in claim 5, wherein the third specified voltage is 0.03V to 0.30V.

20. A battery pack charging method for charging a battery pack having a plurality of lithium ion rechargeable batteries connected in series to a full charge by using a constant current charging and a constant voltage charging, the method comprising:
   performing the constant current charging until a total battery pack voltage reaches a prescribed total voltage;
   switching from the constant current charging to the constant voltage charging after the total battery pack voltage reaches the prescribed total voltage, until a full charge is reached;
   detecting a voltage of each of the plurality of lithium ion rechargeable batteries being charged;
   switching from the constant voltage charging or the constant current charging to a first pulse charging when the voltage of any of the plurality of lithium ion rechargeable batteries exceeds a first specified voltage; and
   during the first pulse charging, switching from the first pulse charging to a second pulse charging after the voltage of any of the plurality of lithium ion rechargeable batteries exceeds a second specified voltage,
   wherein during pulse charging, when the voltage of any of the plurality of lithium ion rechargeable batteries has exceeded the first specified voltage and a first specified time has elapsed, and when the voltage of any of the plurality of lithium ion rechargeable batteries has exceeded a second specified voltage, which is higher than the first specified voltage, and a second specified time has elapsed, charging is suspended, and
   charging is re-started after an interval or a third specified time has elapsed and the voltage of all the batteries has dropped below the first specified voltage.

21. A battery pack charging method for charging a battery pack having a plurality of lithium ion rechargeable batteries connected in series to a full charge by using a constant current charging and a constant voltage charging, the method comprising:
   performing the constant current charging until a total battery pack voltage reaches a prescribed total voltage;
   switching from the constant current charging to the constant voltage charging after the total battery pack voltage reaches the prescribed total voltage, until a full charge is reached;
   detecting a voltage of each of the plurality of lithium ion rechargeable batteries being charged; and
   switching from the constant voltage charging or the constant current charging to a pulse charging after the voltage of any of the plurality of lithium ion rechargeable batteries exceeds a first specified voltage, such that prior to switching to the pulse charging, the constant current charging and the constant voltage charging are repeatedly performed until the voltage of any of the plurality of lithium ion rechargeable batteries has a voltage that exceeds the first specified voltage,
   wherein during pulse charging, when the voltage of any of the plurality of lithium ion rechargeable batteries has exceeded the first specified voltage and a first specified time has elapsed, or when the voltage of any of the plurality of lithium ion rechargeable batteries has exceeded a second specified voltage, which is higher than the first specified voltage, and a second specified time has elapsed, charging is suspended, and
   charging is re-started after an interval or a third specified time has elapsed and the voltage of all the batteries has dropped below the first specified voltage, and
   wherein the first specified time is more than 0 sec to 180 sec.

* * * * *